Figure 1:
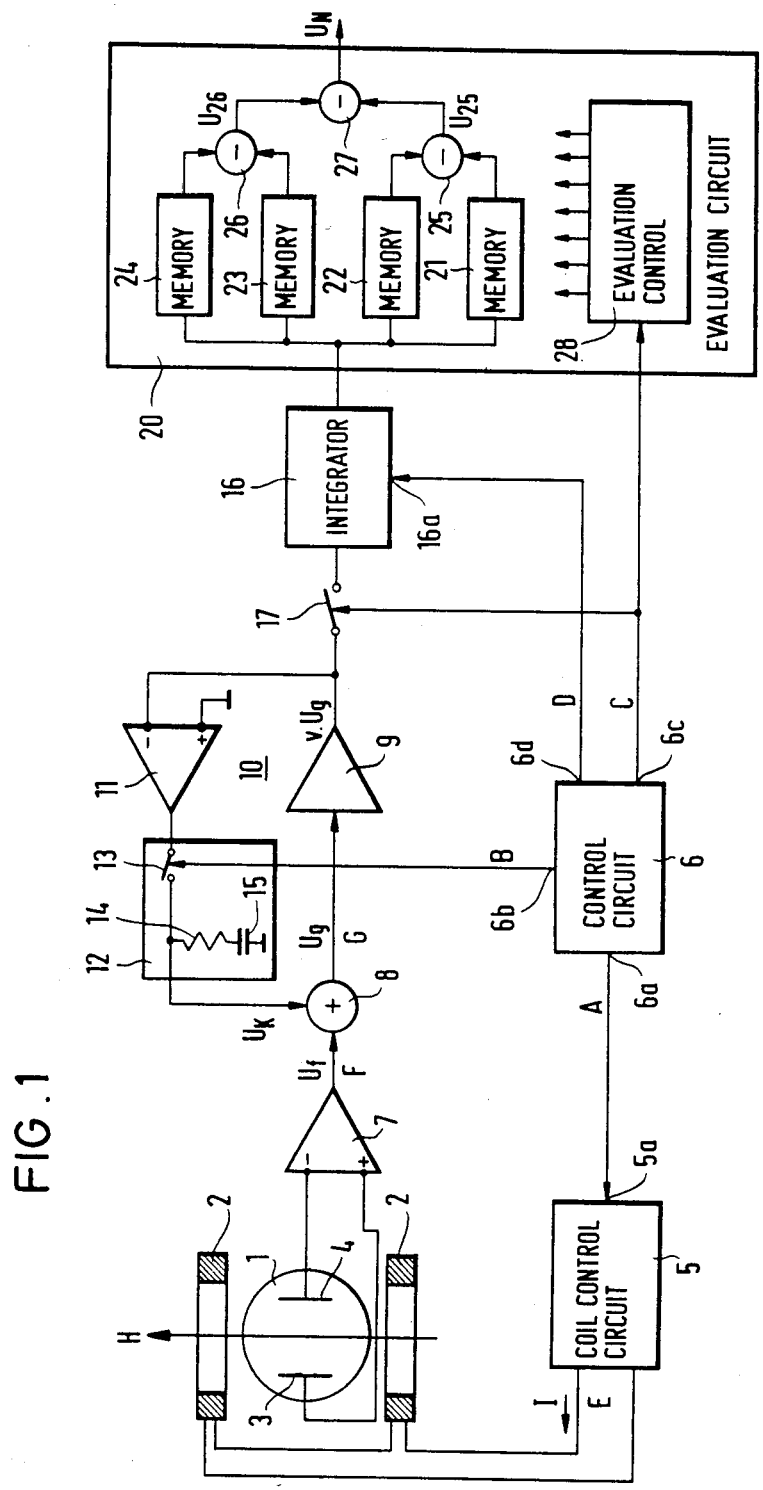

United States Patent [19]

Blatter

[11] Patent Number: 4,704,908
[45] Date of Patent: Nov. 10, 1987

[54] METHOD FOR COMPENSATING INTERFERENCE VOLTAGES IN THE ELECTRODE CIRCUIT IN MAGNETIC-INDUCTIVE FLOW MEASUREMENT

[75] Inventor: Max Blatter, Münchenstein, Switzerland

[73] Assignee: Flowtec AG, Switzerland

[21] Appl. No.: 921,230

[22] Filed: Oct. 20, 1986

[30] Foreign Application Priority Data

Oct. 23, 1985 [DE] Fed. Rep. of Germany ....... 3537752

[51] Int. Cl.$^4$ ............................................. G01F 1/58
[52] U.S. Cl. ................................................. 73/861.17
[58] Field of Search ..................................... 73/861.17

[56] References Cited

U.S. PATENT DOCUMENTS 4,210,022  7/1980  Boss ................................. 73/861.17
4,382,387  5/1983  Hafner ............................. 73/861.17
4,651,286  3/1987  Fukai et al. ...................... 73/861.17

FOREIGN PATENT DOCUMENTS 3314954  10/1984  Fed. Rep. of Germany .

OTHER PUBLICATIONS

JP-Patents Abstracts of Japan, vol. 4, No. 172, Nov. 27, 1980, No. 55-116220.

Primary Examiner—Charles A. Ruehl
Attorney, Agent, or Firm—Barnes & Thornburg

[57] ABSTRACT

In magnetic-inductive flow measurement with periodically reverse-poled DC magnetic field (with or without field-free phases) the signal voltage in each half period is sampled during a measuring signal sampling interval and the signal value obtained by the sampling is stored. For compensating an interference DC voltage superimposed on the measuring signal in a compensation interval following each measuring signal sampling interval within the same half period by sampling and storing the signal voltage a compensation voltage is generated which compensates the signal voltage within the compensation interval to the value zero. The compensation voltage is stored and superimposed on the signal voltage until the next compensation interval. During a correction sampling interval following each compensation interval within the same half period the signal voltage is again sampled and the signal value thereby obtained also stored. To recover a useful signal value firstly the difference is formed between the stored signal values obtained between two compensation intervals in different half periods and then the differences formed between two difference values obtained in this manner.

5 Claims, 5 Drawing Figures

METHOD FOR COMPENSATING INTERFERENCE VOLTAGES IN THE ELECTRODE CIRCUIT IN MAGNETIC-INDUCTIVE FLOW MEASUREMENT

The invention relates to a method for compensating interference voltages in the electrode circuit in magentic-inductive flow measurement with periodically reverse-poled DC magnetic field in which the magnetic field in successive half periods assumes alternately oppositely poled values and the useful signal is obtained in that the signal voltage in each half period is sampled during a measuring signal sampling interval and the difference is formed between in each case two signal values obtained at oppositely poled values of the magnetic field, and in which in a compensation interval following each measuring signal sampling interval within the same half period by sampling and storing the signal voltage a compensation voltage oppositely superimposed on the signal voltage is generated which compensates the signal voltage to the value zero within the compensation interval and is retained until the next compensation interval.

Methods of this type are known from U.S. Pat. Nos. 4,210,022 and 4,382,387. In these known methods in each half period there is a measuring signal sampling interval and a compensation interval following said sampling interval. By the superimposed compensation voltage and the forming of the difference between two successively obtained signal values an interference DC voltage contained in the signal voltage is suppressed even when said interference DC voltage linearly varies between two successive measuring signal sampling intervals. In the method according to U.S. Pat. No. 4,382,387 the magnetic field is reversed in polarity at the end of each half period directly to the oppositely poled value. Thus, in each compensation interval the magnetic field has the same value as in the preceding measuring signal sampling interval so that the compensation voltage stored in the compensation interval also includes the full measuring voltage. The useful signal value obtained by forming the difference thus corresponds to the sum of four successively sampled measuring voltage values, i.e. about four times the value of the measuring voltage component contained in the signal voltage. In contrast, in the method according to U.S. Pat. No. 4,210,022 in each half period an active phase in which the magnetic field assumes the one or other of the two oppositely poled values is followed by a field-free phase in which the magnetic field assumes the value zero. In each half period the measuring signal sampling interval lies in the active phase and the compensation interval in the field-free phase. In this case the useful signal value obtained by the formation of the difference corresponds to the sum of two successively sampled measuring voltage values, i.e. about double the value of the measuring voltage component contained in the signal voltage because the compensation voltage sampled in the field-free phase and stored does not contain any measuring voltage component.

In magnetic-inductive flow meters two tendencies are apparent:

there is a trend to increasingly higher magnetic field frequencies and a resulting improved limit frequency behaviour;

the aim is a smaller power requirement but this involves reduced sensitivity.

The tendency to use increasingly smaller coil powers results in smaller field strengths and accordingly also smaller signal levels. Consequently, the useful signal level increasingly approaches the AC voltage interference level which is caused by amplifier noise, flow turbulences and similar effects and hereinafter in its entirety will be referred to as noise signal. The known method is not an optimum one as regards the noise signal suppression because in each sampling a random instantaneous value of the noise signal is superimposed on the sampled useful signal. By employing integrating RC members in the sample and hold circuits it is admittedly possible to obtain a certain averaging of the noise signal but this effect is very limited because the RC time constants must always be dimensioned substantially smaller than the generation of the sample and compensation intervals available. If the duration of the compensation intervals is not sufficient the compensation voltage cannot settle to the new value and as a result the compensation voltage includes errors which find their way into the measurement result. A further source of error is that the individual measuring voltage components from which each useful signal value obtained at the output is made up is obtained by various amplifiers which possibly do not have the same frequency behaviour.

The problem underlying the invention is to provide a method of the type outlined at the beginning in which the noise signals are substantially suppressed, possible errors of the compensation voltage rendered ineffective and the measurement result not impaired by different frequency behaviour of amplifiers.

According to the invention this problem is solved in that (a) the signal value obtained by sampling the signal voltage in each measuring signal sampling interval is stored;

(b) the signal voltage is again sampled during a correction sampling interval following each compensation interval within the same half period and the signal value thereby obtained is stored;

(c) the difference between the stored signal values obtained in each case between two compensation intervals in different half periods is formed;

(d) the difference between in each case two difference values obtained in this manner is formed to obtain a useful signal value.

In the method according to the invention in each half period two samplings of the signal voltage take place, the first sampling lying in known manner before the compensation interval. In contrast, the second sampling takes place in the same half period after the compensation interval and is carried out on the compensated signal voltage which thus consists essentially only of the noise signal components, any errors of the compensation voltage and any changes of the measurement voltage which have meanwhile taken place. By this additional formation of the difference the signal value obtained in the correction sampling interval and stored is subtracted from the stored signal value which was obtained and stored in the measuring signal sampling interval of the following half period using the same compensation voltage. Consequently, the noise signal components and any errors of the compensation voltage contained in the signal values obtained in these two samplings are eliminated by the formation of the difference. Two difference values obtained successively and freed from interference components in this manner are then used as the two signal values from which by again forming the difference a useful signal value is obtained. As in the known method this useful signal value is then freed from the superimposed interference DC voltage and from linear variations of said interference DC voltage.

The method according to the invention may be used both in a magnetic-inductive flow measurement without field-free phases (as in U.S. Pat. No. 4,382,387) and in a magnetic-inductive flow measurement with field-free phases (as in U.S. Pat. No. 4,210,022). The useful voltage value obtained at the output corresponds in the first case again to four times the value and in the second case again to twice the value of the measuring voltage component contained in the signal voltage.

According to a preferred further development of the invention a particularly good suppression of the noise signal is obtained in that the signal voltage is integrated over the period of each sampling interval and the integration value obtained by the integration is stored as signal value.

Figure 2:
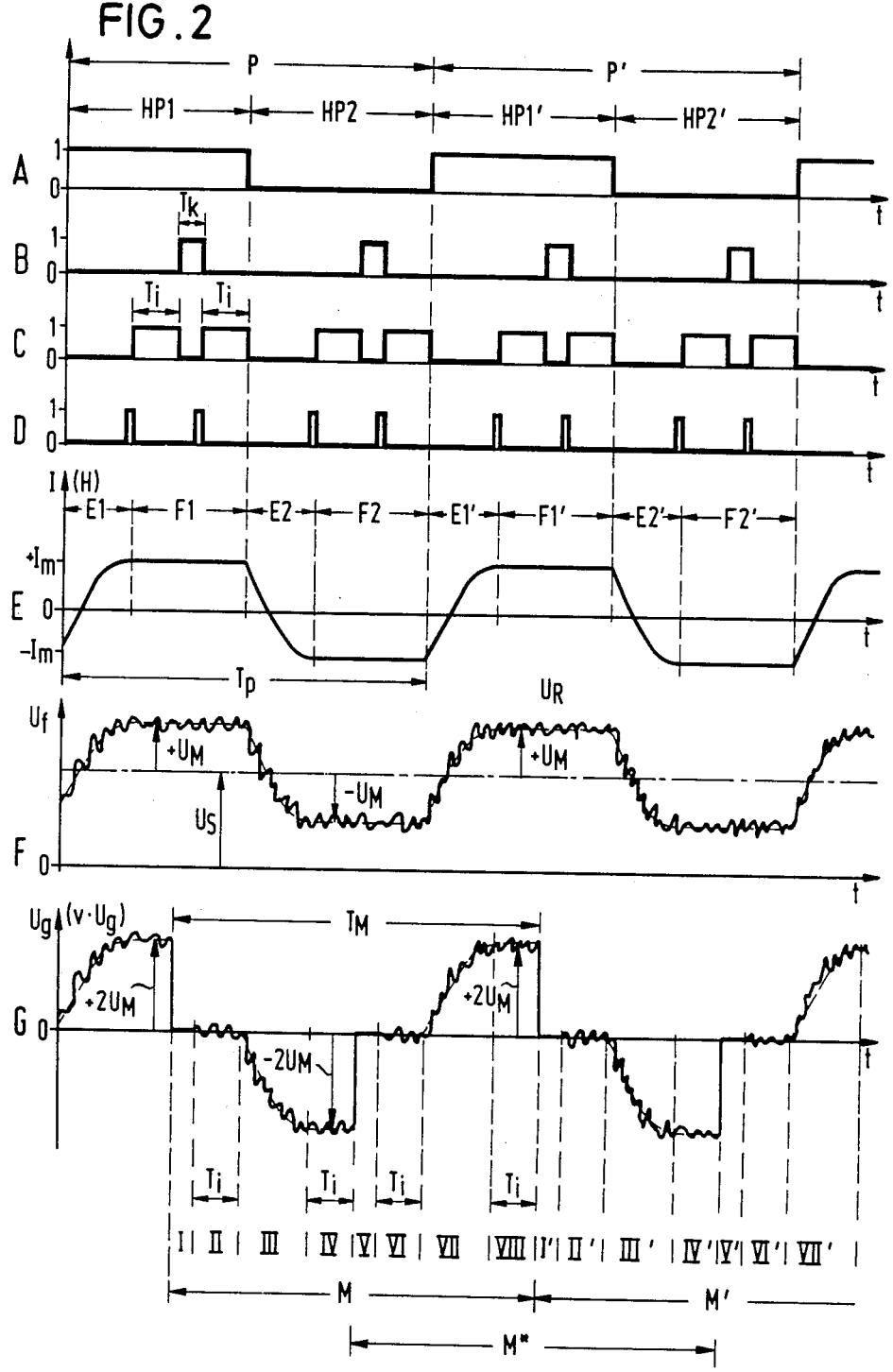
Figure 3:
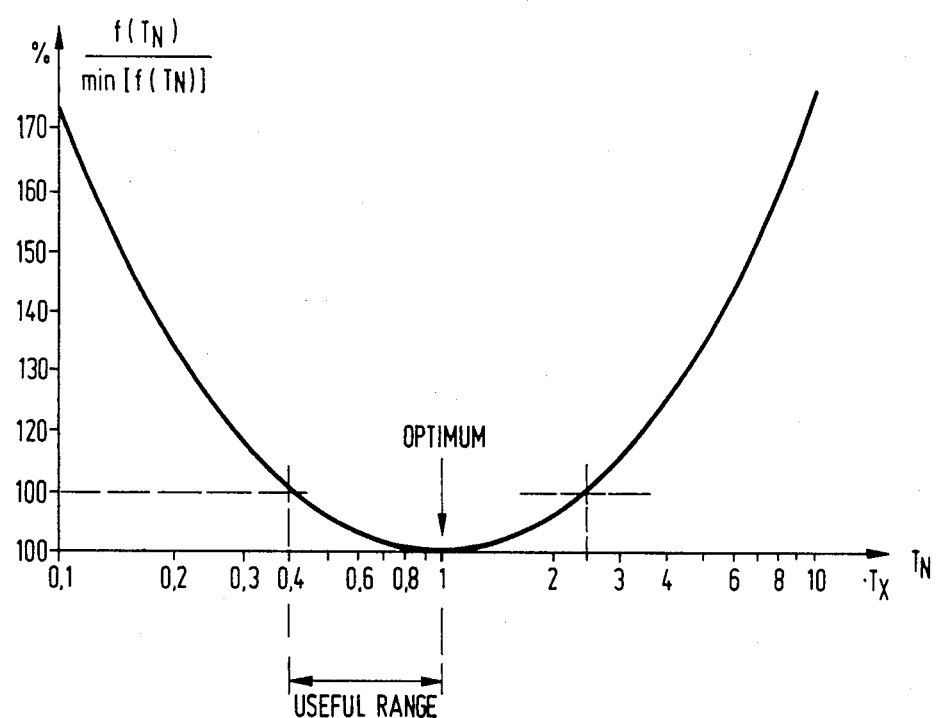
Figure 4:
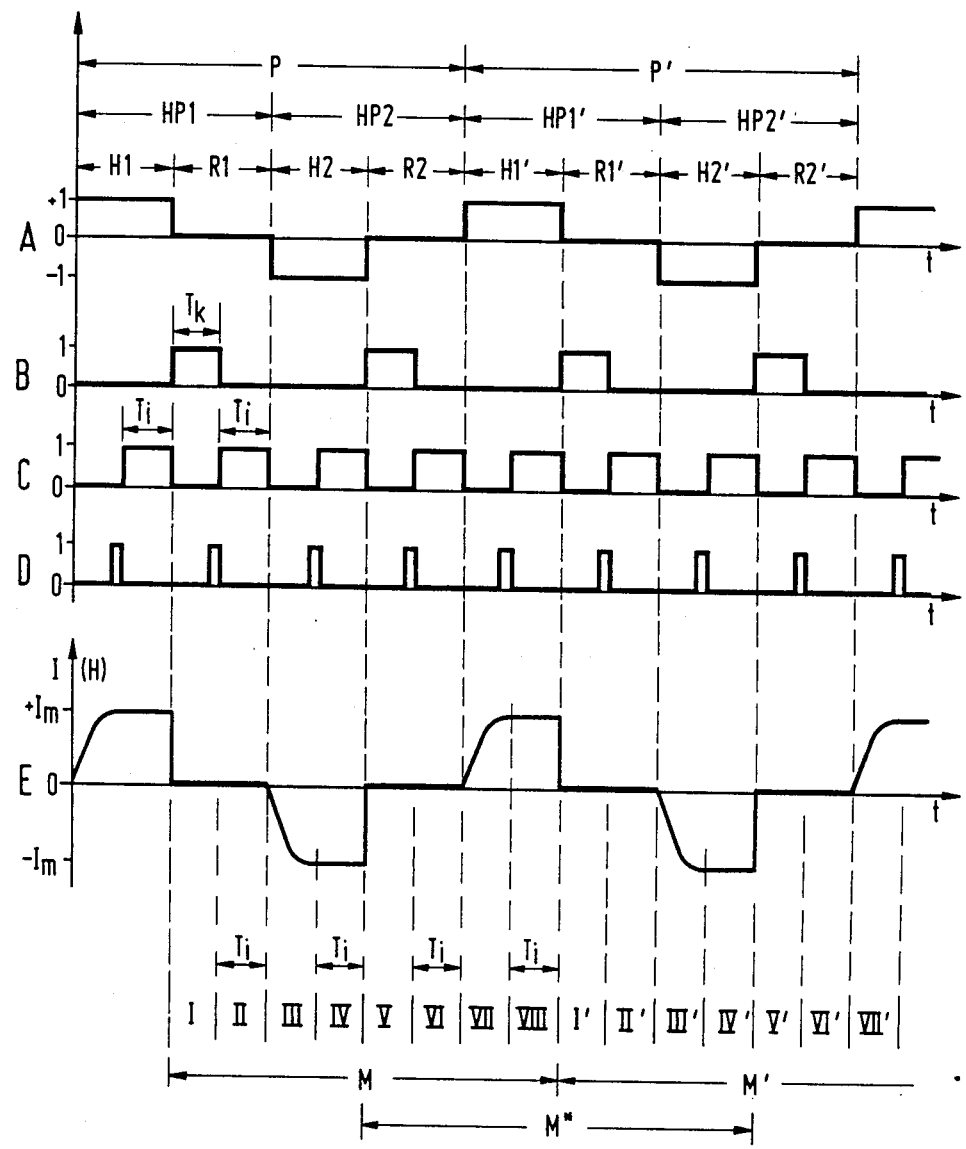
Figure 5:
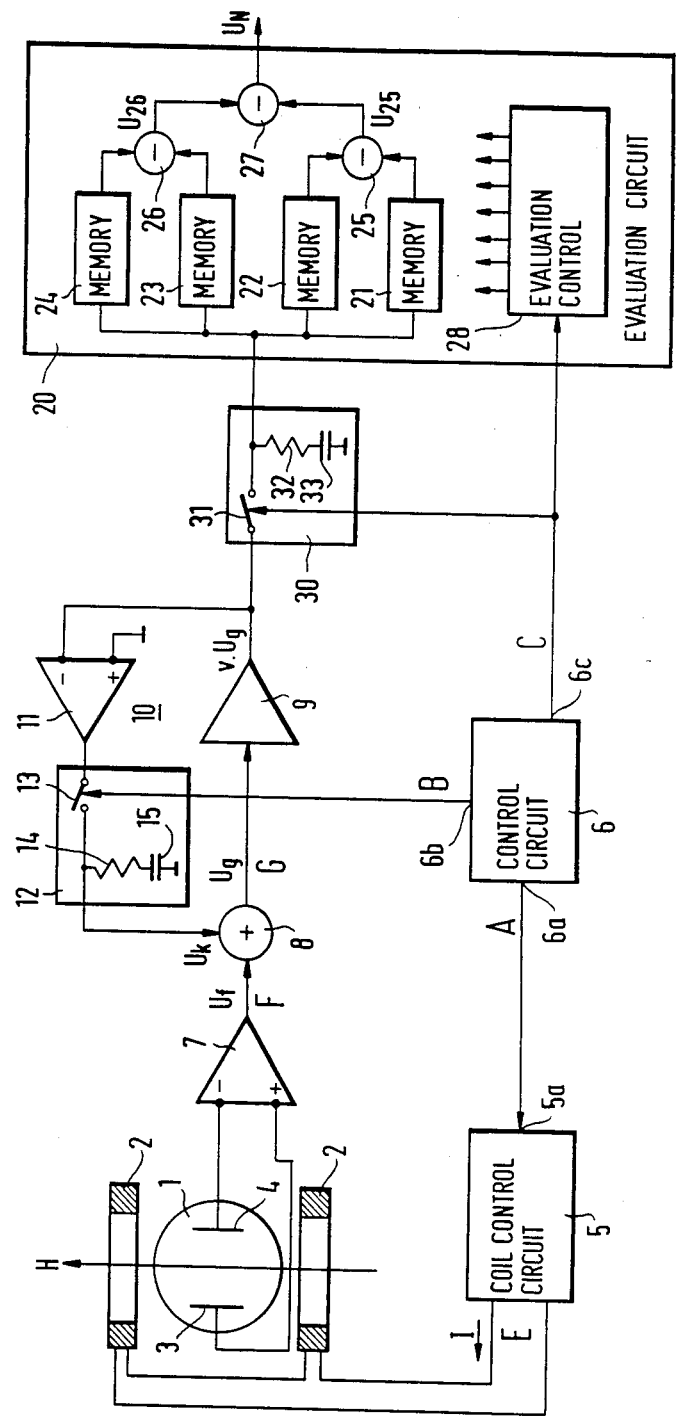

Further features and advantages of the invention will be apparent from the following description of examples of embodiment with the aid of the drawings, wherein:

FIG. 1 is a block scheme of an arrangement for carrying out the method,

FIG. 2 shows time diagrams of signals which occur at various points of the arrangement of FIG. 1 when the magnetic-inductive flow measurement is carried out without field-free phases, FIG. 3 is a diagram to explain the optimum dimensioning of the integration time, FIG. 4 are time diagrams of signals which occur at various points of the arrangement of FIG. 1 when the magnetic-inductive flow measurement is carried out with field-free phases, and FIG. 5 is a modified embodiment of the arrangement of FIG. 1.

FIG. 1 shows schematically a flow metering arrangement which partially corresponds to the flow metering arrangement illustrated and described in U.S. Pat. No. 4,382,387. The flow measuring arrangement contains an internally insulated tube 1 through which an electrically conductive liquid flows perpendicularly to the plane of the drawing and the purpose of the flow measuring arrangement is to furnish an electrical signal which represents the mean flow rate of the electrically conductive liquid in the tube 1. A magnetic field coil 2 divided for reasons of symmetry into two equal halves disposed on either side of the tube 1 generates in the tube a magnetic field H directed perpendicularly to the tube axis. In the interior of the tube 1 two electrodes 3 and 4 are disposed from which an induced measuring voltage can be tapped which in accordance with the known measuring principle of magnetic-inductive flow meters, based on Faraday's law, is proportional to the mean flow rate of the electrically conductive liquid through the magnetic field. This measuring voltage in magnetic-inductive flow meters is generally superimposed on an interference DC voltage which has its origin in particular in different electrochemical equilibrium potentials and in the course of time can reach values several times the measuring voltage.

A coil control circuit 5 controls the current flowing through the magnetic field coil 2 in dependence upon a control signal A which is furnished by the output 6a of a control circuit 6 and applied to a control input 5a of the coil control circuit 5.

The electrodes 3 and 4 are connected to the two inputs of a differential amplifier 7. The differential amplifier 7 has a small gain so that even in the event of a large interference DC voltage (in a typical case ±1 V) it cannot be overloaded. The output of the differential amplifier 7 is connected to an input of a summation circuit 8 to the output of which the input of an amplifier 9 with a gain v is connected.

The other input of the summation circuit 8 is connected to the output of the amplifier 9 by a compensation circuit 10 of known type, the purpose of which is to suppress the interference DC voltage contained in the output voltage $U_f$ of the differential amplifier 7 and thereby keep said interference voltage away from the input of the amplifier 9 so that the latter is not overloaded. The compensation circuit 10 contains an operational amplifier 11 whose inverting input is connected to the output of the amplifier 9 and whose non-inverting input, which serves as reference input, is connected to ground. Connected to the output of the operational amplifier 11 is a sample and hold circuit 12 which contains a switch 13, a resistor 14 and a storage capacitor 15. The switch 13 is actuated by a control signal B furnished by the output 6b of the control circuit 6. The output of the sample and hold circuit 12 is connected to the second input of the summation circuit 8.

When the circuit 13 is closed there is a closed-loop control circuit from the output of the amplifier 9 via the operational amplifier 11, the sample and hold circuit 12 and the summation circuit 8 to the input of the amplifier 9. This control circuit brings the voltage at the inverting input of the operational amplifier 11, i.e. the output voltage of the amplifier 9, to the reference potential applied to the non-inverting input, i.e. ground potential. The output of the sample and hold circuit 12 thus assumes in each compensation interval defined by the closing of the switch 13 a compensation voltage $U_k$ which is opposite and equal to the signal voltage $U_f$ which is simultaneously present at the other input of the summation circuit 8 and is furnished by the output of the differential amplifier 7 so that the output voltage $U_g$ of the summation circuit 8 and thus also the output voltage $v.U_g$ of the amplifier 9 is made zero. The storage capacitor 15 charges itself via the resistor 14 to this compensation voltage $U_k$ so that the latter even after opening of the switch 13, i.e. in the holding phase of the sample and hold circuit 12, remains at the output thereof. Thus, by the next compensation interval in the summation circuit 8 this stored compensation voltage $U_k$ is added to the particular signal voltage $U_f$ applied. To prevent the capacitor 15 discharging after the opening of the switch 13 an impedance converter can be connected after the output of the sample and hold circuit 12 in usual manner; for simplification this converter is not shown in the drawings.

The resistor 14 and the capacitor 15 form together an integrating network whose time constant effects that the terminal voltage of the capacitor 15 cannot follow delay-free changes of the output voltage of the operational amplifier 11. This averages rapid changes of the output voltage of the operational amplifier 11 during the closure time of the switch 13 but it is also necessary to match the duration of the compensation interval and the time constant of the integrating member to each other so that the compensation voltage $U_k$ can settle to the necessary value in each compensation interval.

An integrator 16 is further connected via a switch 17 to the output of the amplifier 9. The switch 17 is actuated by a control signal C furnished by an output 6c of the control circuit 6. The integrator 16 has a reset input 16a which is connected to a further output 6d of the control circuit 6. The control cicuit 6 furnishes at the output 6d a control signal D which consists of short reset pulses. Each short reset pulse supplied to the input 16a resets the integrator 16 to a predetermined initial state for the integration. The initial state is preferably the state zero, as will be assumed hereinafter.

When the switch 17 is closed the output voltage v.$U_g$ of the amplifier 9 is applied to the signal input of the integrator 16. The integrator 16 integrates the voltage v.$U_g$ from the initial state zero defined by the preceding reset pulse over the duration of the integration interval defined by the closure time of the switch 17. At the end of each integration interval an output signal is available at the output of the integrator 16 which corresponds to the integration value of the voltage v.$U_g$ over the integration time.

Connected to the output of the integrator 16 is an evaluation electronic arrangement 20 which from the integration values furnished by the integrator 16 forms useful signal values $U_N$ which represent the flow rate to be measured. The evaluation electronic arrangement 20 is so constructed that it can separately store four integration values successively furnished by the integrator 16 and form prescribed differences between the stored integration values. In the embodiment illustrated diagrammatically in FIG. 1 the evaluation electronic system 20 includes for this purpose four memories 21, 22, 23, 24 and three subtraction circuits 25, 26, 27. When the output signals of the integrator 16 are analog signals the components of the evaluation electronic arrangement 20 may be analog circuits which are connected to each other in the manner illustrated and the operation of which is controlled by an evaluation control 28 also contained in the evaluation electronic arrangement 20. The evaluation control 28 is synchronized in the necessary manner with the operation of the integrator 16 which can be done for example as illustrated in FIG. 1 in that it also receives the control signal C from the output 6c of the control circuit 6. As a rule, it is preferred to design the evaluation electronic arrangement 20 for digital signal processing, preferably by using a microcomputer. The memories 21, 22, 23, 24 shown discrete in FIG. 1 are then memory areas of the main memory of the microcomputer and the functions of the subtraction circuits 25, 26, 27 are performed by the microprocessor of the microcomputer, the working program of the microcomputer taking over the functions of the evaluation control 28. Between the integrator 16 and the evaluation electronic arrangement 20 an analog-digital converter may then be disposed which convertes the analog output signals of the integrator 16 to digital signals which are suitable for processing in the microcomputer. Preferably, however, the integrator 16 is constructed in this case so that it supplies directly digital signals representing the integration values.

The diagrams A, B, C, D, E, F, G of FIG. 2 show the time profile of signals which occur at the points of the circuit of FIG. 1 designated by the same letters when the flow measuring arrangement is operated without field-free phases as described in U.S. Pat. No. 4,382,387.

The diagrams A, B, C, D represent the control signals which are furnished by the control circuit 6 and can assume either the signal value 1 or the signal value 0. The control signal A illustrated in diagram A and supplied to the coil control circuit 5 is a periodic square-wave signal of which two consecutive periods P and P' are illustrated. The control signal A assumes in the period P during a half period HP1 the signal value 1 and during the other half period HP2 the signal value 0. The corresponding half periods of the following period P' are designated HP1' and HP2'.

In the case of the control signals B and C applied to the switches 13 and 17 the signal value 1 denotes the closure of the switch and the signal value 0 the opening of the switch. Each square-wave pulse of the signal value 1 in the diagram B thus defines a compensation interval of duration $T_k$ in the course of which the voltage $U_g$ at the output of the summation circuit 8 is compensated to zero. Each square-wave pulse of the signal value 1 in the diagram C defines a sample and integration interval of duration $T_i$ in the course of which the voltage v.$U_g$ is sampled and integrated in the integrator 16.

The reset pulses of the diagram D are short pulses which appear in time in each case just before the square-wave pulses of the diagram C.

The coil control circuit 5 is so constructed that at the signal value 1 of the control signal A it attempts to send a direct current of constant magnitude in the one direction through the magnetic field coil 2 and at the signal value 0 of the control signal A a direct current of the same magnitude but opposite direction. The coil control circuit 5 contains a current regulator which regulates the current for each polarity to the same constant value $+I_m$ and $-I_m$. The variation of current flowing through the magnetic field coil 2 is illustrated in diagram E. Due to the inductance of the magnetic field coil after each reversal the current reaches the constant $I_m$ of opposite polarity only with a certain delay. It is assumed in the diagram E that on reversal from negative to positive in the half period HP1 the regulated positive value $+I_m$ is reached within a settling or transient time E1 and that during the remaining time F1 of the half period HP1 the constant current value $+I_m$ obtains. Correspondingly, on reversal from the positive to the negative value in the half period HP2 the constant negative value $-I_m$ is reached within the transient time E2 and retained during the remaining time F2. The same processes repeat themselves in the corresponding time portions E1', F1', E2', F2', of the following period P' and in each further period in identical manner.

The magnetic field H exhibits the same time variation as the current I so that the diagram E also applies to the magnetic field H. During the time interval F1 the magnetic field H has a constant field strength $H_m$ of the one polarity and during the time interval F2 the same constant field strength $H_m$ of opposite polarity. The period duration $T_p$ of the magnetic field period is equal to the duration of each period P, P' ... of the control signal A and the magnetic field periods coincide in time with the periods P, P', ... of the control signal A.

The diagram F shows the time variation of the signal voltage $U_f$ at the output of the differential amplifier 7. The voltage $U_f$ contains a measuring voltage component $U_M$ which is proportional to the flow rate in the tube 1 and the field strength of the magnetic field H. With a constant flow rate or a flow rate varying only slowly compared with the period duration $T_p$ the measuring voltage component $U_M$ thus exhibits the same time profile as the magnetic field H or the current I in the diagram E. This time profile of the measuring voltage component $U_M$ is shown in diagram F in dashed line. The measuring voltage $U_M$ is superimposed on the interference DC voltage $U_S$ which has its origin in particular in different electrochemical equilibrium potentials and is independent of the magnetic field and of the flow rate. The interference DC voltage $U_S$ is not constant with time but gradually varies. It can reach values amounting to several times the measuring voltage $U_M$. For simplification, the variation with time of the interference DC voltage $U_S$ is not shown in the diagram F; it is generally also very small within the course of a period duration.

Finally, a noise signal $U_R$ is also superimposed on the measuring voltage $U_M$ and is generated by amplifier noise, flow turbulences and other interfering influences. Thus, the signal voltage $U_f$ furnished at the output of the differential amplifier 7 exhibits the variation illustrated in diagram F by a full line.

Diagram G shows the voltage $U_g$ obtained by the effect of the compensation circuit 10 at the output of the summation circuit 8. The compensation voltage $U_k$ assumes in each compensation interval, i.e. during each interval of time in which the control signal B has the signal value 1, the same magnitude as the signal voltage $U_f$ but of opposite sign and retains the value which it reaches at the end of a compensation interval until the start of the next compensation interval. By the compensation the voltage $U_g$ in each compensation interval is brought to the value zero and since the compensation voltage $U_k$ after the end of the compensation interval remains further superimposed on the voltage $U_f$ the variation with time of the voltage $U_g$ being that shown in diagram G.

Since the output voltage $v \cdot U_g$ of the amplifier 9 differs from the voltage $U_g$ only by the gain v the diagram G also applies to the output voltage of the amplifier 9 but to a different voltage scale.

Entered below the diagram G is a complete measuring cycle M divided into eight time portions I, II, III, IV, V, VI, VII, VIII. The following measuring cycle is denoted by M' and its time portions correspondingly bear the designations I', II', III', IV' . . . . Measuring cycle refers in each case to the time interval in the course of which all the signal values are obtained which are used for forming a useful signal value $U_N$. The duration $T_M$ of each measuring cycle is equal to the period duration $T_P$ of the magnetic field period but the measuring cycles M are offset in time with respect to the magnetic field periods P.

The first time portion I of the measuring cycle M corresponds to a square-wave pulse of the control signal B, i.e. to a compensation interval of duration $T_k$. In this compensation interval the compensation votage $U_{k(I)}$ is formed which is equal but opposite to the signal voltage $U_{f(I)}$ obtaining in the same time interval. The voltage $U_{g(I)}$ obtained at the output of the summation circuit 8 by summation of the voltages $U_{f(I)}$ and $U_{k(I)}$ is thus substantially brought to the value zero in the time portion I.

Shortly before the start of the time portion II the integrator 16 is reset to zero by a reset pulse D.

The time portion II coincides with a pulse of the control signal C and is thus a sample and integration interval of duration $T_i$ in the course of which the voltage $v \cdot U_{g(II)}$ at the output of the amplifier 9 is sampled by closing the switch 17 and integrated in the integrator 16.

In the time portion II the control loop of the compensation circuit 10 is opened but the compensation voltage $U_{k(I)}$ is still superimposed on the voltage $U_f$. The voltage $U_{f(II)}$ in the time portion II differs from the voltage $U_{f(I)}$ in the preceding time portion I at the most in a slight rise of the interference DC voltage $U_S$ and in a possible change of the measuring voltage $U_M$ if the flow rate is not constant, but mainly in the irregularities of the superimposed noise signal $U_R$. If it is assumed that the interference DC voltage $U_S$ and the measuring voltage $U_M$ have remained unchanged, the voltage $U_{g(II)}$ in the time interval II will therefore substantially consist only of noise signal components whilst the measuring voltage $U_{M(II)}$ and the interference DC voltage $U_{S(II)}$ are still compensated out by the compensation voltage $U_{k(I)}$. The corresponding amplified voltage $v \cdot U_{g(II)}$ at the output of the amplifier 9 is thus sampled in the time portion II by closure of the switch 17 and integrated in the integrator 16 over the integration time $T_i$ from zero onwards. The integration ends with the opening of the switch 17 at the end of the time portion II. At the output of the integrator the integration result is then available as integration value $\overline{U_{g(II)}}$.

The noise signal components sampled in the time portion II and integrated and possible errors of the compensation voltage $U_k$ are used to correct the measurement result as will be explained hereinafter. The time interval II can therefore be referred to as "correction sampling interval".

At the end of the time portion II the integration value $\overline{U_{g(II)}}$ is entered by the evaluation control 28 in the memory 21. This operation can for example be initiated by the falling edge of the square-wave pulse of the control signal C.

The following time portion III corresponds to the transient time E2 in the half period HP2 in which the current I in the magnetic field coil goes from the positive value $+I_m$ to the negative value $-I_m$ and the magnetic field H is thus reversed in polarity. Since the magnetic field H in this time portion is not constant the time portion III cannot be used for flow measurement.

Shortly before the start of the time portion IV the integrator 16 is reset to zero by a reset pulse D.

The time portion IV is again a sample and integration interval because it coincides with a pulse of the control signal C. The time portion IV corresponds to the portion of the time interval F2 which lies before the next compensation interval and in which the current I has its constant negative value $-I_m$ and the magnetic field is constant in the oppositely poled direction. The measuring voltage component $U_M$ in the voltage $U_{f(IV)}$ thus has the opposite sign (negative) whilst the sign of the interference DC voltage $U_S$ remains unchanged. Since the compensation voltage $U_{k(I)}$ is still superimposed on the voltage $U_{k(IV)}$ the measuring voltage component $-U_M$ contained in the compensation voltage is now added to the negative measuring voltage component $-U_M$ of the voltage $U_{f(IV)}$ whilst the interference DC voltage components $U_S$ still cancel each other out. The voltage $U_{g(IV)}$ thus consists in the time portion IV substantially of twice the value of the measuring voltage (with negative sign) and the superimposed noise signal.

During the period of the time portion IV the corresponding voltage $v \cdot U_{g(IV)}$ is sampled by closing the switch 17 and in the integrator 16 integrated over the integration time $T_i$ from zero onwards. Since the sampled signal voltage consists essentially of the useful measuring voltage component $-2U_M$ the time portion IV is a "measuring signal sampling interval".

At the end of the time portion IV at the output of the integrator 16 the integration value $\overline{U_{g(IV)}}$ is available.

This integration value is entered by the evaluation control 28 in the memory 22.

With the time portion IV the first half of the measuring cycle M has expired. In the time portions V, VI, VII, VIII of the second half the same processes repeat themselves with opposite signs of current, magnetic field and measuring voltage.

The time portion V is again a compensation interval of duration $T_k$ in which the compensation voltage $U_{k(V)}$ is formed which is equal and opposite to the signal voltage $U_{f(V)}$ obtaining in the same time portion. By summation of these two voltages the voltage $U_{g(V)}$ at the output of the summation circuit 8 is brought substantially to the value zero as in the time portion I.

Just before the start of the time portion VI the integrator 16 is reset to zero by a reset pulse D.

The time portion VI is again defined by a pulse of the control signal C and thus a sample and integration interval of duration $T_i$. In this time portion VI the voltage $U_{f(VI)}$, apart from the superimposed noise signal $U_R$, still has substantially the same value as in the time portion V and since the stored and superimposed compensation voltage $U_{k(V)}$ also remains unchanged the voltage $U_{g(VI)}$ in the time portion VI consists essentially again only of noise signal components and possible errors of the compensation voltage $U_k$. This is thus again a "correction sampling interval".

The integration value $\overline{U_{g(VI)}}$ obtained by sampling and integrating the voltage $v.U_{g(VI)}$ is entered in the memory 23.

The time portion VII corresponds to the transient time E1' in the first half period HP1' of the next magnetic field period P'. In this time portion the current I again goes from the negative value $-I_m$ to the positive value $+I_m$ and the magnetic field H is again reversed in polarity. Consequently, this time portion cannot be used for the flow measurement.

Just before the time portion VIII the integrator 16 is reset to zero by a reset pulse D.

The time portion VIII is the last sample and integration interval of the measuring cycle M. In the time portion VIII the magnetic field H again has the constant value of the first polarity and the voltage $U_{f(VIII)}$, apart from intermediate changes of the interference DC voltage $U_S$ and/or of the flow rate and of the superimposed noise signal $U_R$, again has the same value as in the time intervals I and II. The sign of the measuring voltage component $U_M$ is again positive whilst the sign of the interference voltage component $U_S$ remains unchanged. Since the compensation voltage $U_{k(V)}$ is still superimposed on the signal voltage $U_{f(VIII)}$ the positive measuring voltage components $+U_M$ in these two voltages now add up whilst the interference DC voltage components still cancel each other out. The voltage $U_{g(VIII)}$ thus consists in the time portion VIII substantially of the value of the actual measuring voltage, the measuring voltage compensated in the time portion V, the possible error of the compensation voltage $U_k$ and the superimposed noise signal $U_R$. Thus, the time portion VIII is again a "measuring signal sample interval". The voltage $v.U_{g(VIII)}$ is sampled in the time portion VIII by closure of the switch 17 and integrated in the integrator 16 over the integration time $T_i$ from zero onwards. The integration value $\overline{U_{g(VIII)}}$ obtained at the end of the time portion VIII is entered by the evaluation control 28 into the memory 24.

The measuring cycle M is thus completed and in the memories 21 to 24 of the evaluation electronic arrangement 20 there are the four integration values obtained in the course of said measuring cycle which are subsequently processed to obtain a useful signal value $U_N$.

For this purpose the evaluation control 28 initiates execution of the following operations:

1. The subtraction circuit 25 forms the difference between the integration values stored in the memories 21 and 22:

$$U_{25} = \overline{U_{g(IV)}} - \overline{U_{g(II)}}$$

2. The subtraction circuit 26 forms the difference between the integration values stored in the memories 23 and 24:

$$U_{26} = \overline{U_{g(VIII)}} - \overline{U_{g(VI)}}$$

3. The subtraction circuit 27 forms the difference between the difference values obtained at the outputs of the subtraction circuits 25 and 26:

$$U_N = U_{26} - U_{25} = (\overline{U_{g(VIII)}} - \overline{U_{g(VI)}}) - (\overline{U_{g(IV)}} - \overline{U_{g(II)}})$$

These operations have the following meanings:

1. By the subtraction in the subtraction circuit 25 two integration values are subtracted from each other, said values having been obtained between the two compensation intervals I and V, i.e. having been formed using the same compensation voltage $U_{k(I)}$. All the errors made in the formation of this compensation voltage and the noise signal components contained in this compensation voltage are thus eliminated by forming this difference. Furthermore, the noise signal components integrated in the integration intervals II and IV also compensate each other. The doubled value of the integrated measuring voltage $U_M$ contained in the second integration value $\overline{U_{g(IV)}}$ is however preserved.

2. By the subtraction in the subtraction circuit 26 two integration values are subtracted from each other which have been obtained between the compensation interval V of the current measuring cycle M and the first compensation interval I' of the next measuring cycle M', i.e. have been formed using the same compensation voltage $U_{k(V)}$. Thus, once again the same effects result as regards the suppression of the noise signal components and errors of the compensation voltage.

3. By the difference formation in the subtraction circuit 27 two signal values largely freed from errors of the compensation voltages and from noise signal components are subtracted from each other. When this is done the integrated measuring voltage components contained in these signal values add up due to the opposite signs. The useful voltage value obtained thus contains four times the value of the integrated measuring voltage $U_M$ (or in the case of a varying measuring voltage the sum of four successively integrated measuring voltage values).

It is immediately apparent from a comparison with the method known from U.S. Pat. No. 4,382,387 that the output signals of the two subtraction circuits 25 and 26 play the part of the sampling values used in the known method for forming the useful voltage values. Thus, as in the known method by the difference formation in the subtraction circuit 27 linear changes of the interference DC voltage $U_S$ are also eliminated. The newly incorporated difference formations in the subtraction circuits 25 and 26 using integration values obtained in the additional interference sample intervals II and VI directly following the compensation intervals give the additional advantages that the noise signals are optimally averaged over the observation time portions II, IV, VI, VIII available and that errors possibly made in the formation of compensation voltages $U_K$ are eliminated. In particular, four measuring signal values are equivalently processed as regards the measuring amplifier properties and the noise voltage suppression. In addition, the differences between the integration values obtained in the time portions IV, II and VIII, VI can advantageously also be further processed by the method of digital filtering, enabling the variable interference DC voltage differences to be optimally suppressed as well.

The same operations repeat themselves in the following measuring cycle M' in the course of which once again four integration values are entered into the memories of the evaluation electronic arrangement and processed in the manner indicated to form a useful signal value.

It is additionally possible to double the number of useful signal values obtained by utilizing each integration value twice. In diagram G of FIG. 2 a measuring cycle M* is shown which overlaps with half of each of the measuring cycles M and M'. The measuring cycle M* is thus made up of the time portions V, VI, VII, VIII of the measuring cycle M and of the time portions I', II', III', IV' of the measuring cycle M'. Like the measuring cycles M and M' the measuring cycle M* also begins with a compensation interval. The first half of the measuring cycle M' is carried out automatically when the integration values $\overline{U_{g(VI)}}$ and $\overline{U_{g(VIII)}}$ in the time intervals VI and VIII have been entered into the memories 23 and 24, and the second half of the measuring cycle M* is carried out automatically when the integration values $\overline{U_{g(II')}}$ and $\overline{U_{g(IV')}}$ in the intervals II' and IV' of the next measuring cycle M' have been entered into the memories 21 and 22. By formation of the differences between these four stored sampling values in the previously indicated manner a useful signal value $U_N$ is also formed for the measuring cycle M*. In this way after every half period of the magnetic field a valid measurement value for the flow in the tube 1 can be obtained.

The following points are to be noted regarding the dimensioning of the time intervals of the measuring cycle indicated in FIG. 2:

For a given construction of the flow meter the duration $T_E$ of the transient times E1 and E2 in each period P is fixed. The duration $T_k$ of the compensation intervals is also preset in magnitude by the minimum time constant of the control loop of the compensation circuit. Thus, of the total duration of a measuring cycle M the transient time portions III and VII and the compensation time portions I and V cannot be freely selected as regards their duration. These time portions are the "dead times" which cannot be utilized for signal observation and flow measurement. The total dead time $T_X$ in a measuring cycle M is thus fixed and amounts to $$T_X = T_I + T_{III} + T_V + T_{VII}$$

In contrast, the duration of the sampling and integration intervals II, IV, VI and VIII are freely selectable. In the example of embodiment described above all the integration intervals have the same duration $T_i$:

$$T_{II} = T_{IV} = T_{VI} = T_{VIII} = T_i$$

This is the optimum case because the corresponding integrated signal voltages then go into the measurement with the same weight.

The important point is thus to determine the optimum integration time $T_i$ with regard to the noise suppression.

The total time $T_N$ utilizable for signal observation and flow measurement is equal in each measuring cycle M to the sum of the four sampling and integration intervals:

$$T_N = T_{II} + T_{IV} + T_{VI} + T_{VIII} = 4 \cdot T_i$$

To determine the optimum it is further assumed that the spectral noise voltage density is inversely proportional to the root of the field frequency (cf. for example 1/f noise in semiconductors). It is also known that the noise voltage decreases with increasing ratio $T_N/T_P$ corresponding to the factor $$\frac{1}{\sqrt{T_N/T_P}}$$

Thus, to minimize the resulting noise voltage the minimum of the function $$f(T_N) = \frac{\sqrt{T_P}}{\sqrt{T_N/T_P}} = \frac{T_P}{\sqrt{T_N}} = \frac{T_N + T_X}{\sqrt{T_N}}$$

is to be found.

Analysis shows that this function has its minimum at $$T_N = T_X$$

This means that the total integration time is to have the same length as the total time not utilizable for signal observation.

It is frequently desirable for other reasons to make the field changeover frequency as high as possible wihtout however going too far away from the optimum of the noise signal suppression. In FIG. 3 the relative variation of the function $f(T_N)$ is shown. It is apparent that the total integration time can be selected substantially in the range $$T_N = 0.4 T_X \ldots 1.0 T_X$$

without the resulting noise voltage increasing by more than 10%.

The diagrams A, B, C, D, E of FIG. 4 show the time variation of the signals which occur at the circuit points of FIG. 1 designated by the same letters when the magnetic-inductive flow metering arrangement is operated with field-free phases as described in U.S. Pat. No. 4,210,022. To the extent to which the designations and values entered in FIG. 4 correspond to those of FIG. 2 they have the same meaning; they will therefore not be explained again in detail. The voltage diagrams F and G of FIG. 2 are omitted in FIG. 4 for simplification because only the position of the measuring cycle portions with respect to the different time variation of the magnetic field is important.

The essential difference of the method of FIG. 4 from the method of FIG. 2 resides in the different time variation of the magnetic field H (diagram E) which is obtained by a different time variation of the control signal A. The control signal A can assume three different values +1, 0, −1 and the coil control circuit 5 is designed so that the coil current I and thus the magnetic field H also assume three values in dependence upon the control signal A, the assignment being as follows:

| Control signal A | Coil current I | Magnetic field H |
|---|---|---|
| +1 | $+I_m$ | $+H_m$ |
| 0 | 0 | 0 |
| −1 | $-I_m$ | $-H_m$ |

The magnetic field period P is again divided into two half periods HP1 and HP2. The control signal A assumes the signal value +1 only in a first portion H1 of the half period HP1 whereas in the remaining portion R1 of the half period HP1 it has the signal value 0. In a first portion H2 of the second half period HP2 the control signal H has the signal value −1 and in the remaining portion R2 of the half period HP2 the control signal A again has the signal value 0.

Accordingly, in the first half period HP1 there is an active phase H1 in which the magnetic field H assumes the value $+H_m$ and a following field-free phase R1 in which the magnetic field H assumes the value 0. In the second half period HP2 there is an active phase H2 in which the magnetic field M assumes the oppositely poled value $-H_m$ and a following field-free phase R2 in which the magnetic field H assumes the value 0. The same operations repeat themselves of course in the next period P' and in each further period.

The control signals B, C and the corresponding time portions of the measuring cycle M have the following time locations with respect to these magnetic field phases:

The compensation interval I which coincides with a control pulse B lies in the first part of the field-free phase R1.

The correction sampling interval II which coincides with a control pulse C lies following the compensation interval I also in the field-free phase RI.

The measuring signal sampling interval IV which coincides with a control pulse C lies in the part of the active phase H2 in which the magnetic field H has reached its constant value $-H_m$.

The compensation interval V lies in the first part of the field-free phase R2.

The correction sampling interval VI lies following the compensation interval V likewise in the field-free phase R2.

The measuring signal sampling interval VIII lies in the active phase H1' of the following period P'.

The formation and storing of the compensation voltage $U_k$ and the sampling and integration of the voltage $v.U_g$, the storing of the integration values and the formation of the differences of the stored integration values in the evaluation electronic arrangement 20 take place in exactly the same manner as described above with regard to the diagrams of FIG. 2. The same applies also to the previously defined rule for optimum dimensioning of the integration times.

There is however the following difference compared with the previously described method: Since the formation and storing of the compensation voltage $U_k$ now takes place in the field-free phases the stored compensation voltage values do not contain any measuring voltage components. Consequently, each useful signal value $U_N$ obtained at the output of the evaluation electronic arrangement 20 corresponds to the sum of two sampled measuring voltage values instead of the sum of four sampled measuring voltage values as in the method of FIG. 2.

Apart from this difference however with the method of FIG. 4 the same advantageous effects are obtained as with the method of FIG. 2.

FIG. 5 shows a modified embodiment of the flow measuring arrangement which differs from that of FIG. 1 only in that the integrator 16 is replaced by a sample and hold circuit 30 which can have the same structure and the same mode of operation as the sample and hold circuit 12 of the compensation circuit 10. The sample and hold circuit 30 includes a switch 31, a resistor 32 and a storage capacitor 33. The switch 31 is actuated by the control signal C furnished by the output 6c of the control circuit 6. The reset pulses D furnished in the embodiment of FIG. 1 at the output 6d of the control circuit 6 are not required in the embodiment of FIG. 5. The other parts of the arrangement of FIG. 5 and their functions are unchanged compared with the embodiment of FIG. 1 and consequently the diagrams of FIG. 2 and FIG. 4 apply fundamentally to the arrangement of FIG. 5 as well.

During each sampling interval defined by closure of the switch 31 the output voltage $v.U_g$ of the amplifier 9 is sampled and stored in the storage capacitor 33, fluctuations of the voltage $v.U_g$ occurring during the sampling interval being averaged by the integration effect of the RC member 32, 33. In high-speed applications the resistor 32 can of course be dispensed with. At the end of each sampling interval at the output of the sample and hold circuit 30 a sample value is available. The two new sample values obtained after each measuring signal sampling interval are entered with the preceding sample values in the same manner as the integration values obtained in the arrangement of FIG. 1 into the memories 21 to 24 of the evaluation electronic arrangement 20 and after completion of each measuring signal sampling interval the differences between the stored sample values are formed in the manner outlined above by the subtraction circuits 25, 26, 27, resulting in useful signal value $U_N$. Of course, this can again be carried out by a microprocessor if the sample values are previously subjected to an analog-digital conversion.

It should be observed that the sample and hold circuit 30 in spite of the integration effect of the RC member 32, 33 is not an integrator in the sense of the integrator 16 of FIG. 1. Since the sample and hold circuit 30 is not reset to a defined initial state before each sampling operation it does not carry out an integration of the sampled signal voltage $v.U_g$ and consequently the sample value obtained at the end of each sampling interval is different from the integration value which would be obtained for the same signal voltage in the integrator 16.

Although the suppression of the noise signal obtained by integration in the flow measurement arrangement of FIG. 1 is optimal, the additional interference sampling and difference formation, even with a simple signal sampling as used in FIG. 5, gives a substantial improvement over the methods known from U.S. Pat. Nos. 4,382,387 and 4,210,022.

I claim:

1. Method for compensating interference voltages in the electrode circuit in magnetic-inductive flow measurement with periodically reverse-poled DC magnetic field in which the magnetic field in successive half periods assumes alternately oppositely poled values and the useful signal is obtained in that the signal voltage in each half period is sampled during a measuring signal sampling interval and the difference is formed between in each case two signal values obtained in oppositely poled values of the magnetic field, and in which in a compensation interval following each measuring signal sampling interval within the same half period by sampling and storing the signal voltage a compensation voltage oppositely superimposed on the signal voltage is generated which compensates the signal voltage to the value zero within the compensation interval and is retained until the next compensation interval, said method comprising the following steps:

(a) storing a first measuring signal value and a second measuring signal value obtained by sampling the signal voltage in a measuring signal sampling interval in each half period;

(b) sampling the signal voltage during a correction sampling interval following each compensation interval in each half period to form a first correction signal value and a second correction signal value;

(c) storing the first correction signal value and the second correction signal value;

(d) forming the difference between the stored signal values obtained in each case between two compensation intervals in different half periods to obtain a first difference between the first measuring signal value and a first correction signal value and a second difference between the second measuring signal value and the second correction signal value; and (e) forming the difference between the second difference value and the first difference value to obtain a useful signal value.

2. Method according to claim 1, wherein the signal voltage is integrated over the duration of each sampling interval and the integration value obtained by the integration is stored as signal value.

3. Method according to claim 2, wherein all the integration intervals are of substantially equal magnitude.

4. Method according to claim 2, wherein in each magnetic field period the ratio of the total duration of the integration intervals to the total duration of the remaining time intervals lies in the range of about 0.4 to 1.0.

5. Method according to claim 4, wherein in each magnetic field period the total duration of the integration intervals is substantially equal to the total duration of the remaining time intervals.

* * * * *